United States Patent [19]
Szajewski

[11] Patent Number: 5,822,621
[45] Date of Patent: Oct. 13, 1998

[54] CAMERA WITH SMILE SOUND

[75] Inventor: Richard Peter Szajewski, Rochester, N.Y.

[73] Assignee: Eastman Kodak Company, Rochester, N.Y.

[21] Appl. No.: 897,874

[22] Filed: Jul. 21, 1997

Related U.S. Application Data

[63] Continuation of Ser. No. 630,186, Apr. 10, 1996, abandoned.

[51] Int. Cl.$^6$ .................................................. G03B 17/24
[52] U.S. Cl. ........................... 396/6; 396/283; 396/429; 396/543
[58] Field of Search ............................... 396/6, 281, 283, 396/429, 543

[56] References Cited

U.S. PATENT DOCUMENTS

| | | |
|---|---|---|
| 4,072,973 | 2/1978 | Mayo ....................................... 354/295 |
| 4,092,062 | 5/1978 | Kittag . |
| 4,502,771 | 3/1985 | Katsuma et al. ........................ 354/467 |
| 4,896,178 | 1/1990 | Ohmura et al. . |
| 4,905,029 | 2/1990 | Kelley . |
| 4,954,858 | 9/1990 | Ohmura et al. . |
| 5,086,311 | 2/1992 | Naka et al. . |
| 5,170,199 | 12/1992 | Nakai et al. . |
| 5,235,364 | 8/1993 | Ohmura et al. . |
| 5,276,472 | 1/1994 | Bell et al. . |
| 5,313,235 | 5/1994 | Inoue et al. . |
| 5,315,332 | 5/1994 | Hirasaki et al. . |
| 5,387,995 | 2/1995 | Harig . |
| 5,442,231 | 8/1995 | Miyamoto et al. . |
| 5,450,149 | 9/1995 | Cocca . |
| 5,466,560 | 11/1995 | Sowinski et al. . |
| 5,552,850 | 9/1996 | Matsumoto . |

FOREIGN PATENT DOCUMENTS

| | | | |
|---|---|---|---|
| 6-175208 | 6/1994 | Japan ...................................... | 354/467 |
| 2044479 | 10/1980 | United Kingdom . | |
| WO 89/04708 | 6/1989 | WIPO . | |
| WO 94/23338 | 10/1994 | WIPO . | |

*Primary Examiner*—David M. Gray
*Attorney, Agent, or Firm*—Paul A. Leipold

[57] ABSTRACT

The invention relates to a camera comprising means to emit a smile sound.

15 Claims, 4 Drawing Sheets

CAMERA WITH SMILE SOUND

This is a Continuation of application Ser. No. 08/630,186, filed Apr. 10, 1996, now abandoned.

FIELD OF THE INVENTION

This invention relates to a camera with a sound module. More particularly, it relates to a one-time-use camera with a user activated sound-emitting module.

BACKGROUND OF THE INVENTION

One-time-use cameras, also known as single-use cameras or film-with-lens units, have become increasingly popular with consumers. This popularity is apparently based on the simplicity of use and economical nature of these cameras. The simplicity and economy now expected by the consumers of these cameras when combined with the desire to obtain excellent pictures from such cameras have led manufacturers to continually optimize the balance of component properties in such cameras so as to make the picture-taking exercise both as convenient and as fail-proof as possible. The component properties typically optimized include: exposure characteristics, that is, the preset lens aperture and focal length, as well as the preset shutter time; film characteristics, including color balance, photographic sensitivity and exposure latitude; and camera body ergonomics. Many of these cameras are now fitted with flash-units and further modified to permit use in wet environments. Representative examples of one-time-use cameras are described in U.S. Pat. Nos. 4,896,178; 4,954,858; 5,086,311; 5,170,199; 5,235,364; 5,315,332; and 5,337,099. The co-optimization of these cameras and films is further described and cataloged in U.S. Pat. Nos. 5,442,231 (Nozawa) and 5,466,560 (Sowinski et al).

In the effort to make these cameras suitable for picture-taking under a wide variety of lighting conditions, manufacturers have employed the most light sensitive and long exposure-latitude films consistent with obtaining adequate color balance and reproduction, adequately low graininess, and adequately high sharpness in the final prints. They have also employed the most economical-to-manufacture lenses. Further, they have preset exposure times to be just short enough so that camera motion will be a negligible factor under most conditions of use, that is, when the user is consciously attempting to hold the camera still. Practically, this means setting the exposure time at about $\frac{1}{100}$ to $\frac{1}{125}$ second, which is shorter than an average rest heart rate.

In unrelated area, it is also known to incorporate sound recording apparatus into high quality still cameras much in the way that sound recording apparatus have been incorporated into motion picture cameras. These devices are all intended to enable a user to associate a sound message with a particular picture. Representative examples of this technological approach are described in U.S. Pat. Nos. 4,905,029 (Kelley); 5,276,472 (Bell et al.); and 5,387,995 and 5,450,149 (both Cocca). Audible warning devices have also been incorporated into reloadable single lens reflex (SLR) cameras.

PROBLEM TO BE SOLVED BY THE INVENTION

While single-use camera settings are indeed adequate for still-life scenes or posed portraiture, a problem arises when a picture taker is confronted with the desire to obtain a candid photograph of a subject while simultaneously attracting the attention of the subject. Such situations arise, for example, in the portraiture of children, during parties and the like. In particular, the picture taker is faced with the dilemma of speaking or moving to attract the subjects' attention, while taking a picture and thereby blurring the captured image, or of waiting until the subjects' attention is fortuitously focused on the camera. The expedient of using shorter exposure times in such one-time-use cameras which, at first glance might seem to serve to alleviate this problem, inherently leads to other difficulties, viz.: making no other design adjustments results in a loss of ability to record images under lower lighting conditions; changing the lens characteristics to restore total exposure costs increased camera size or decreased depth-of-field; increasing film sensitivity to compensate for the lower exposure results in degraded granularity performance. Thus, the problem of providing excellent photographs from one-time-use cameras when trying to attract attention remains a need.

SUMMARY OF THE INVENTION

It is an object of the invention to provide a one-time-use camera capable of attracting the attention of a subject without simultaneously imparting motion to the camera and thereby blurring images taken using the camera.

It is a further object of the invention to make picture taking more pleasurable for both the camera user and the subject.

The invention is generally accomplished by providing a camera comprising means to emit a smile sound.

ADVANTAGEOUS EFFECT OF THE INVENTION

This invention provides the camera user with an easy and entertaining means of quickly attracting the attention of a subject without simultaneously imparting motion to the camera and blurring images of the subject taken using the camera. In this way the overall quality of pictures taken using the camera is improved both in the objective sense of improved image sharpness and in the subjective or artistic sense of improved scene content.

DETAILED DESCRIPTION OF THE INVENTION

This invention has many advantages over the other approaches to reducing image blur under the specific conditions of use described. It provides the camera user with an easy and entertaining means of quickly attracting the attention of a subject without simultaneously imparting motion to the camera and blurring images of the subject taken using the camera. In this way the overall quality of pictures taken using the camera is improved both in the objective sense of improved image sharpness and in the subjective or artistic sense of improved scene content. The overall loss in image quality inherent in other approaches, i.e., a loss of ability to record images under lower lighting conditions, increased camera size, decreased depth-of-field, and degraded film granularity are all avoided. These and other advantages will be apparent from the detailed description below.

"Smile Sound" is defined as a pleasant noise of moderate volume that would attract attention within about a 5 meter range. The smile sound causes the hearer to look toward the sound in a pleasant manner. The term "smile sound" is intended to exclude loud and/or obnoxious sounds such as sirens, buzzers, and screams. It will include what a child would refer to as a happy or silly sound.

The invention provides a camera comprising a sound module, a switch, a shutter, a shutter-release, and a power source, wherein the power source provides power to the sound module and wherein activating the switch triggers the sound module to emit sound.

In one embodiment of the invention, the sound module may be pre-programmed with a verbal, musical, or attention-getting message. In a second embodiment the sound module may be user programmable. In this second embodiment, the sound module may be initially pre-programmed as in the first embodiment, and the pre-programmed message may be overwritten by the user as desired.

The camera is preferably a one-time-use camera having an arm common to both the switch and the shutter-release, where partial movement of the arm activates the switch, and further movement of the arm activates the shutter-release. In a more preferred mode, the camera has a flash unit activated by the shutter-release. Typically, the shutter release causes the shutter to open for between about $\frac{1}{60}$ to $\frac{1}{500}$ second.

In yet another embodiment, the objects of the invention are achieved by providing a camera comprising a light module, a switch, a shutter, a shutter-release, and a power source, wherein the power source provides power to the light module and wherein activating the switch triggers the light module to emit light.

Figure 1:
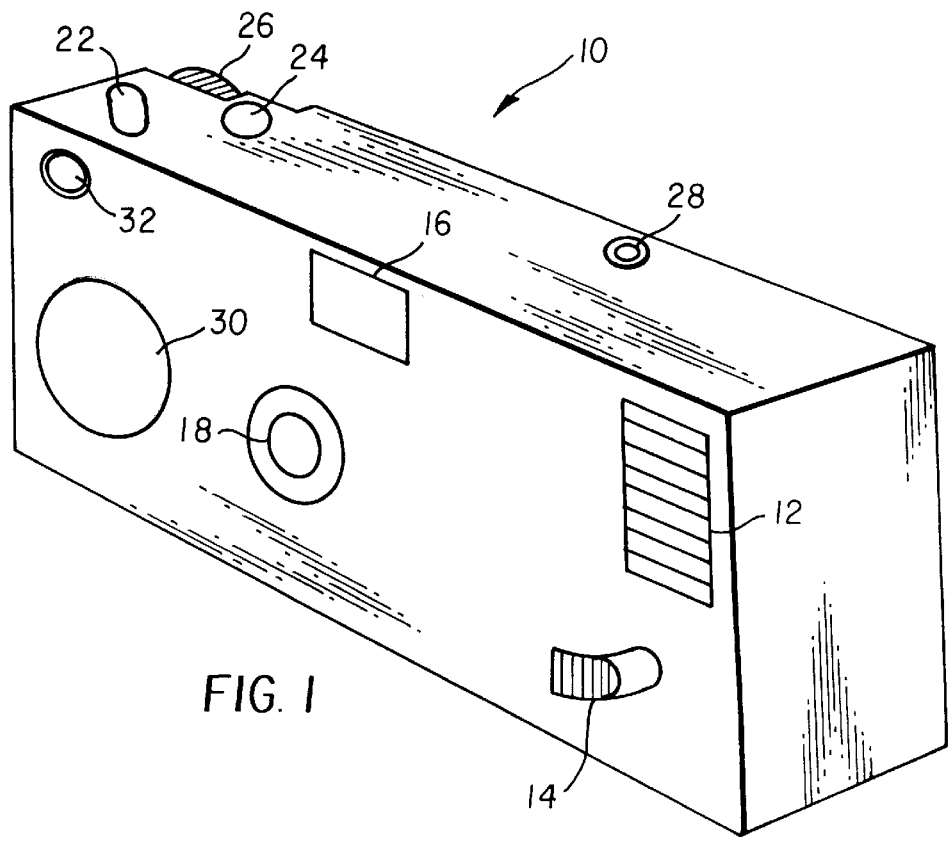
FIG. 1 is a perspective view of a one-time-use camera of the invention providing a sound module and a switch.

Illustrated in FIG. 1 is a camera 10 according to the invention. The camera is a one-time-use camera that is preloaded with film and that is provided with a flash 12. The flash is energized by movement of lever 14. The scene to be photographed is viewed through viewfinder 16 with photographs being taken through lens 18. The camera is further provided with a shutter-release activating button 22 and a film frame counter 24. The film is advanced between pictures by film advance wheel 26. 28 is a flash ready light that lights when the flash is ready for picture taking. The pre-programmed sound module 30 is activated by switch 32. The camera internally contains a battery and connecting circuitry (not shown). When the shutter release activating button 22 is depressed, the shutter opens and the flash unit fires.

The sound module 30 can be any suitably sized pre-programmable sound module known in the art. Typical sound modules suitable for use in the invention are disclosed in U.S. Pat. Nos. 4,704,934 (Nosrati); 4,756,222 (Armato); 4,809,246 (Jeng); 4,990,092 (Cummings); 5,119,932 (Semanoff); and 5,312,282 (Cooper), the disclosures of which are incorporated by reference. The level of sound emitted by the sound module should be loud enough to be heard by the subject without becoming objectionable. The sound should be audible to about 5 meters. Sound levels between that of a whisper and normal conversation are particularly contemplated. Typically, this means a sound output level of between about 5 and 70 decibels, preferably between about 10 and 60 decibels, and most preferably between about 15 and 45 decibels. The sound module may also include a volume control. Typically, the sound module will emit a message having a duration of less than about 20 seconds and preferably between about 3 and 15 seconds. Useful sound modules can typically store analog or digitized sound information on an integrated circuit (IC) in non-volatile fashion. When the sound information is stored in digitized form, the sound module additionally includes a digital to analog converter circuit. Additional sound modules and techniques for recording on these sound modules are shown in incorporated by reference U.S. Pat. No. 5,444,767 (Goetcheus et al). While switch 32 is shown in the drawing as a pushbutton, it can be any type of switch activated by the camera user. In particular, it can be a switch activated by compression of a flexible portion of the camera body.

Most generally, the camera 10 will be generally rectangular in shape and can meet the requirements of easy handling and transportability in, for example, a pocket, when the camera as described herein has a limited volume. The camera should have a total volume of less that about 450 cubic centimeters (cc), preferably the total volume is less than about 380 cc, more preferably the total volume is less than about 300 cc, and most preferably the total volume is less than about 220 cc. The depth to height to length proportions of such a camera will generally be in an about 1:2:4 ratio, with a range in each dimension of about 25% so as to provide comfortable handling. Generally the minimum useable depth is set by the focal length of the incorporated lens and by the dimensions of the incorporated film spools. The camera will preferably have the majority of corners and edges finished with a radius-of-curvature of between about 0.2 and 3 centimeters.

Any camera speed imaging means employable in known single-use, one-time-use, or film-with-lens cameras may be employed as the image capture means of the current invention. These one-time-use cameras can provide specific features as known in the art such as shutter means, film advance means, waterproof housings, single or multiple lenses, lens selection means, variable aperture, focus or focal length lenses, means for monitoring lighting conditions, means for altering shutter times or lens characteristics based on lighting conditions or user provided instructions, and means for recording use conditions directly on the film, as for example by means of a magnetic layer.

The single-use cameras employed in this invention can be any of those known in the art. These cameras can provide specific features as known in the art such as shutter means, film advance means, waterproof housings, single or multiple lenses, lens selection means, variable aperture, focus or focal length lenses, means for monitoring lighting conditions, means for altering shutter times or lens characteristics based on lighting conditions or user provided instructions, and means for recording use conditions directly on the film.

These features include, but are not limited to: providing simplified mechanisms for manually or automatically advancing film and resetting shutters as described at Skarman, U.S. Pat. No. 4,226,517; providing apparatus for automatic exposure control as described at Matterson et al, U.S. Pat. No. 4,345,835; moisture-proofing as described at Fujimura et al, U.S. Pat. No. 4,766,451; providing internal and external film casings as described at Ohmura et al, U.S. Pat. No. 4,751,536; providing means for recording use conditions on the film as described at Taniguchi et al, U.S. Pat. No. 4,780,735; providing lens fitted cameras as described at Arai, U.S. Pat. No. 4,804,987; providing film supports with superior anti-curl properties as described at Sasaki et al, U.S. Pat. No. 4,827,298; providing a viewfinder as described at Ohmura et al, U.S. Pat. No. 4,812,863; providing a lens of defined focal length and lens speed as described at Ushiro et al, U.S. Pat. No. 4,812,866; providing multiple film containers as described at Nakayama et al, U.S. Pat. No. 4,831,398 and at Ohmura et al, U.S. Pat. No. 4,833,495; providing films with improved anti-friction characteristics as described at Shiba, U.S. Pat. No. 4,866,469; providing winding mechanisms, rotating spools or resilient sleeves as described at Mochida, U.S. Pat. No. 4,884,087; providing a film patrone removable in an axial direction as described by Takei et al at U.S. Pat. Nos. 4,890,130 and 5,063,400; providing an electronic flash means as described at Ohmura et al, U.S. Pat. No. 4,896,178; providing an externally operable member for effecting exposure as described at Mochida et al, U.S. Pat. No. 4,954,857; providing film support with modified sprocket holes and means for advancing said film as described at Murakami, U.S. Pat. No. 5,049,908; providing internal mirrors as described at Hara, U.S. Pat. No. 5,084,719; and providing silver halide emulsions suitable for use on tightly wound spools as described at Yagi et al, European Patent Application 0,466, 417A. Additional features of one-time-use cameras are described in U.S. Pat. Nos. 4,954,858 (Ohmura et al); 5,086,311 (Naka et al); 5,170,199 (Kakai et al); 5,235,364 (Ohmura et al); 5,315,332 (Hirasaki et al); and 5,337,099 (Tasaka et al).

A taking lens mounted on the single-use cameras of the invention are generally single aspherical plastic lenses having a focal length between about 10 and 100 mm, and apertures between f/2 and f/32. The focal length is preferably between about 15 and 60 mm, and most preferably between about 20 and 40 nm. Apertures of between f/4 and f/16 are preferred with an aperture of about f/8 to f/12 being more preferred. The lens MTF can be as low as 0.6 or less at a spatial frequency of 20 lines per millimeter (1 pm), although values as high as 0.7, or most preferably 0.8 or above are contemplated. Multiple lens arrangements comprising two, three, or more component lens elements consistent with the functions described above are specifically contemplated.

The shutter means employed with the camera allows an exposure time of between about 1/60 and 1/500 second. It is preferred that the shutter time be between about 1/100 and 1/250 second. Shutter times of shorter than about 1/100 second are preferred so as to minimize sharpness losses due to shake inherent in hand held cameras. Shutter times of less than 1/125 second are preferred, while even shorter shutter times are most preferred. Extremely short shutter times, those less than about 1/500 second can prove disadvantageous since these cameras are often employed in light limited situations.

The camera provides means for exposing more than one scene per unit of film, with arrangements enabling the exposure of 6, 12, 24, 27, 36, 40 or even more distinct scenes being especially preferred. The camera enables exposure of any desired image area on the film. Typical are areas of less than about 10 $cm^2$. Even smaller exposure areas can be employed with values of less than 9, 8, or 7 $cm^2$ being preferred. Exposure areas of 5 $cm^2$ or less are considered as suitable for negative films intended for use to produce snapshot sized prints. Exposure areas between about 5 $cm^2$ and 0.5 $cm^2$ are particularly contemplated. The shape of the exposed area can be rectilinear with an aspect ratio between about 1:1 to up to about 4:1. Typically pleasing aspect ratios include 3:2, 4:3, 7:5, and 16:9, as well as panoramic ratios of about 3:1.

The photographic sensitivity or speed of color negative photographic elements is inversely related to the exposure required to enable the attainment of a specified density above fog after processing. Photographic speed for color negative films with a gamma of about 0.65 has been specifically defined by the American National Standards Institute (ANSI) as ANSI Standard Number PH 2.27-1979 (ASA speed) and relates to the exposure levels required to enable a density of 0.15 above fog in the green light sensitive and least light sensitive color records of a multicolor negative film. This exposure level defines the speed point of the photographic element. This definition conforms to the International Standards Organization (ISO) film speed rating. Larger values of ISO or ANSI film speed indicate a more sensitive photographic element. To be useful in this invention, the photographic element suitably has an ISO speed of greater than about ISO 100. It is preferred that the element be more sensitive, exhibiting an ISO speed of greater than ISO 200, ISO 400 or most preferred ISO 800 or more.

Film latitude relates to the range of exposures that can be successfully recorded by a photographic element. For the purposes of this invention, useful latitude can be quantified by determining the exposure range which provides a straight line relationship between exposure and density after a white light exposure and processing with less than a 5% drop from straight line in either an underexposed (toe) or overexposed (shoulder) regime in a green or red color record. In order to provide a range a recordable exposures, film latitude will generally be in excess of 1.5 log E. Film latitude greater than 2.4 log E is preferred, and film latitude greater than about 3.0 log E is more preferred because this provides a wide range of useful exposure conditions when combined with the lens and shutter characteristics previously described.

In one embodiment, the image capture means employs light sensitive silver halide crystals coated on a flexible support. In this embodiment, it is preferred to employ a high sensitivity, long latitude, high sharpness film exhibiting high environmental insensitivity, favorable tone scale, and favorable color reproduction if a color film. Such high quality films compensate for the known environmental trauma typically suffered by such cameras and the known lens and illumination deficiencies typically inherent in such cameras. Typical films suitable for such uses are described in U.S. Pat. Nos. 5,442,231 (Nozawa) and 5,466,560 (Sowinski et al), the disclosures of which are incorporated by reference.

Figure 2:
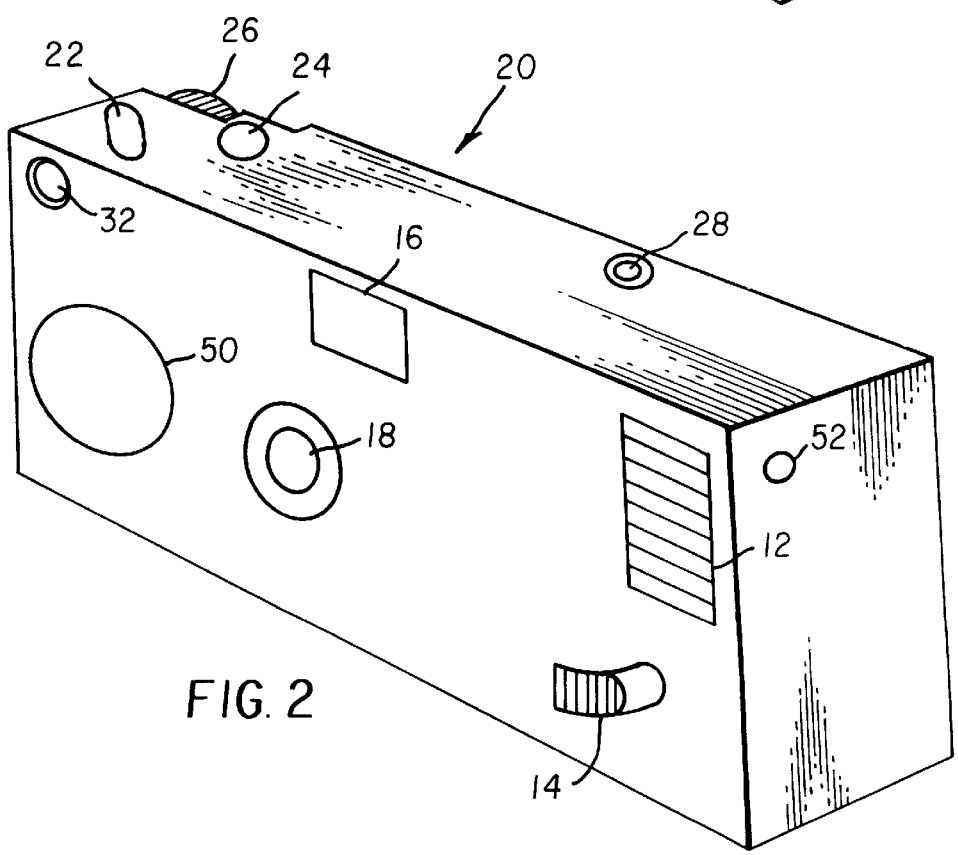
FIG. 2 is a perspective view of a one-time-use camera of the invention providing a user-programmable sound module and a switch.

FIG. 2 illustrates a camera 20 according to the invention. The user-programmable sound module 50 is activated to record by movement of recording-switch 52 and activated to emit sound by switch 32. The other features are as in FIG. 1 and in the related description and are not repeated here.

User-programmable sound modules are also well known in the art and are described in detail in incorporated by reference U.S. Pat. Nos. 5,045,327 (Tarlow) and 5,359,374 (Schwartz). Again, the level of sound emitted by the sound module should be loud enough to be heard by the subject without becoming objectionable. Other features of the sound module are as described above.

Figure 3:
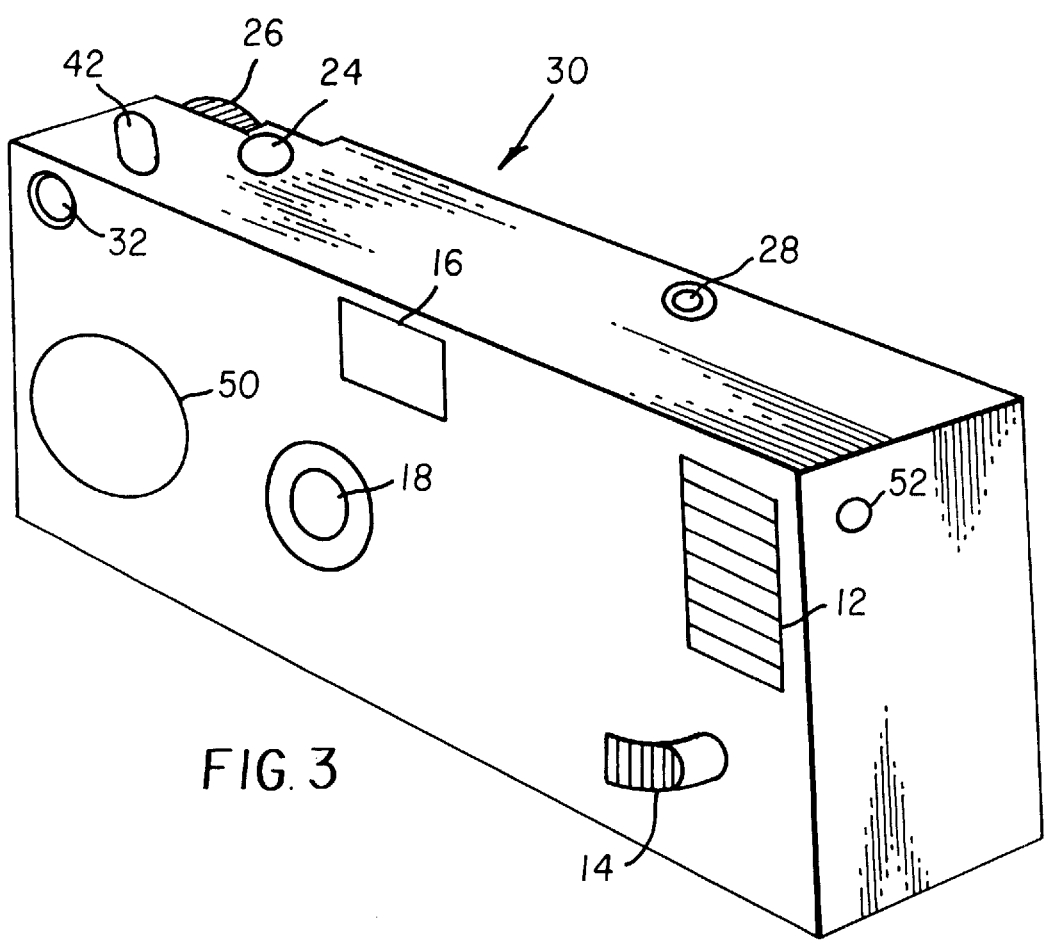
FIG. 3 is a perspective view of a one-time-use camera of the invention providing a user-programmable sound module and a switch to activate the sound module ganged to the flash and shutter release of the camera.

FIG. 3 illustrates a camera 30 according to the invention. The user-programmable sound module 50 is activated to emit sound by depression of the combined shutter-release activating button 42 to a first detent (not shown). Further depression of combined shutter-release activating button 42 activates the shutter release and fires the flash unit. The other features are as in FIG. 1 and are not repeated here.

Figure 4:
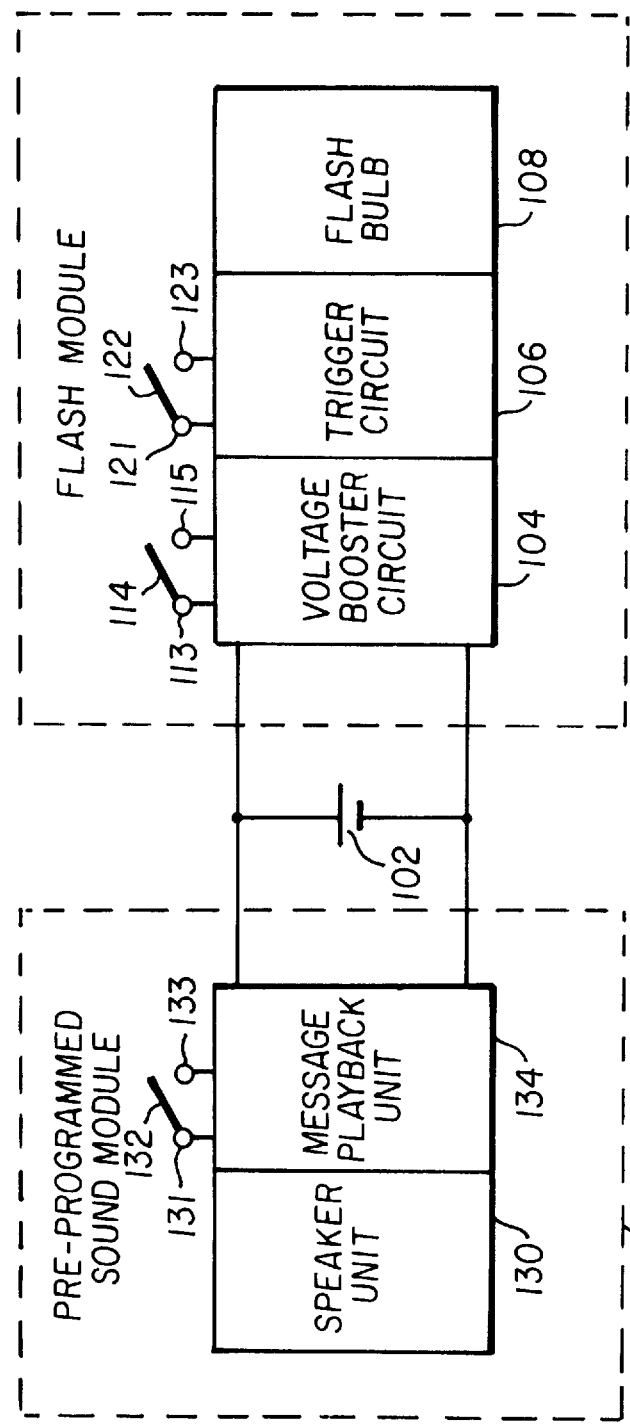
FIG. 4 shows the circuitry internal to a camera having both a flash unit and a pre-programmed sound module.

FIG. 4 illustrates circuitry internal to camera 10 of FIG. 1. Here, power is supplied by battery 102 to both the flash circuitry and the sound module circuitry. The flash circuitry comprises a conventional voltage booster circuit 104, a conventional trigger circuit 106, and a conventional flashbulb 108. Movement of lever 14 of FIG. 1 causes switch contact 114 to electronically connect contact points 113 an 115, thereby activating the voltage booster circuit 104. When the voltage booster circuit has reached full charge, the integral flash ready light, 28 of FIG. 1, lights. Movement of the shutter-release activating button 22 causes contact 122 to electronically connect contact points 121 and 123, thereby activating the trigger circuit 106 and causing the flashbulb 108 to discharge, thereby emitting light at flash 12 of FIG. 1, simultaneously the shutter release button causes the shutter, not shown, to open for a set time and expose the portion of the film in the exposure gate, also not shown. The sound module circuitry comprises a pre-programmed playback unit 134 and a speaker unit 130. Movement of switch 32 causes contact 132 to electronically connect contact points 131 and 133, thereby activating the pre-programmed playback unit 134 which, in turn, causes the speaker unit 130 to emit sound. In an alternative embodiment, the flash circuitry and the sound module circuitry can be powered by separate batteries.

Figure 5:
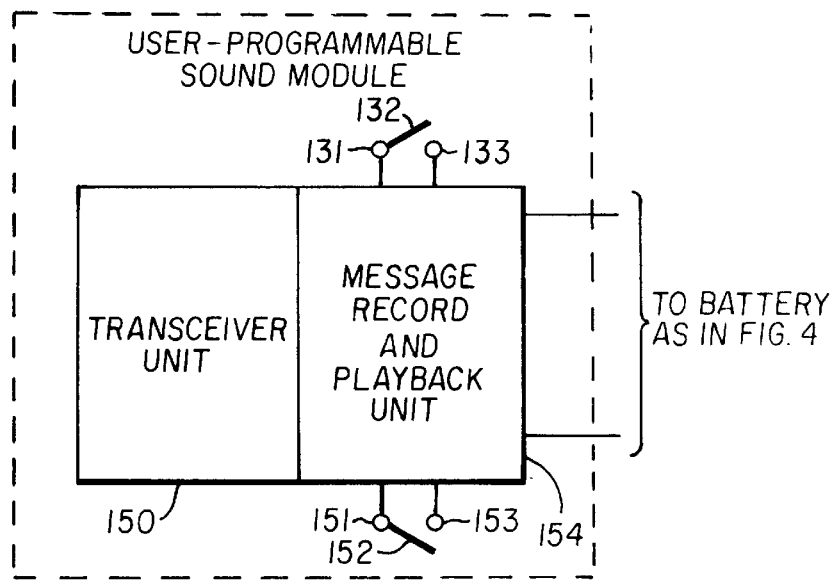
FIG. 5 shows the partial circuitry internal to a camera having both a flash unit and a user-programmable sound module.

FIG. 5 illustrates the circuitry internal to camera 20 of FIG. 2. Here, the sound module circuitry comprises a user programmable playback unit 154 and a transducer/speaker unit 150. Movement of switch 32 causes contact 132 to electronically connect contact points 131 and 133, thereby activating the playback function of user programmable playback unit 154 which, in turn, causes the speaker of transducer/speaker unit 150 to emit sound. Movement of switch 52 causes contact 152 to electronically connect contact points 151 and 153 thereby, activating the program function of the user programmable playback unit 154 which, in turn, enables the transducer of transducer/speaker unit 150 to accept sound which is then recorded in unit 154.

Figure 6A:
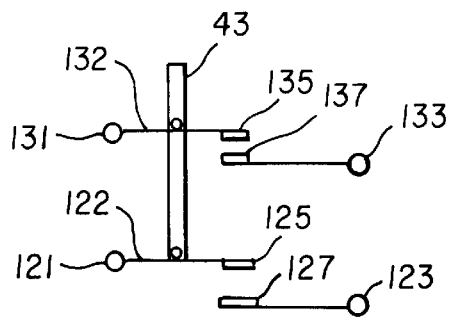
FIG. 6 illustrates the mechanical and electrical connections required to sequentially activate a sound unit and later activate a shutter and flash unit from a common arm.
Figure 6B:
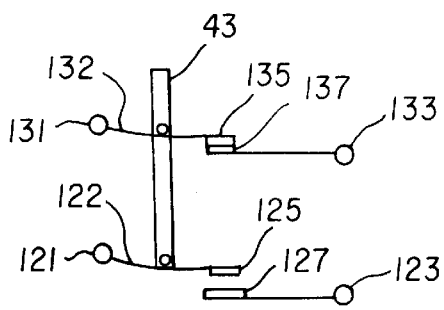
Figure 6C:
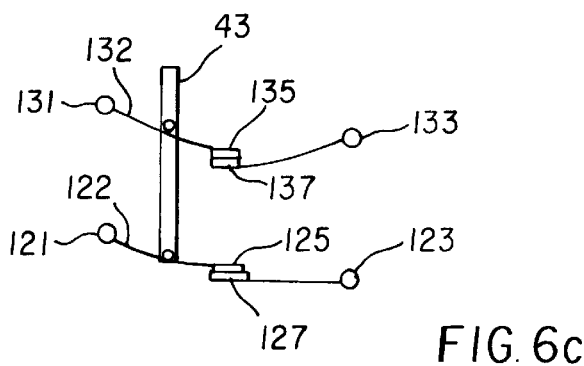

FIGS. 6a, 6b, and 6c illustrate the ganging of contacts 122 and 132 internal to camera 30 of FIG. 3. Here, arm 43 is activated by depression of combined shutter-release activating button 42. FIG. 6a illustrates the normal position of arm 43. FIG. 6b illustrates the position of arm 43 when button 42 has been depressed to the first detent. In this position the playback unit is activated and causes sound to be emitted. FIG. 6c illustrates the position of arm 43 when button 42 is fully depressed. In this position the flash unit fires to emit light and the shutter opens to allow exposure of a picture.

The invention has been described in detail with particular reference to preferred embodiments thereof, but it will be understood that variations and modifications can be effected within the spirit and scope of the invention.

I claim:

1. A one-time-use camera comprising a sound module, said sound module comprising means to emit a smile sound:
   a body of generally rectangular shape and characterized in having a total volume of up to 450 cubic centimeters and a depth to height to length ratio of about 1:2:4; said body having a front face and a parallel rear face, each said face defined by the aforesaid height and length;
   a single aspherical plastic lens permanently mounted to said front face and characterized in having a preset focal length of between 10 and 100 mm and a preset aperture of between f/2 and f/32;
   preloaded with a light sensitive photographic element mounted within said body and positioned to be exposable through said lens; said element having a photographic sensitivity of greater than ISO 100 and a latitude of greater than 1.5 log E; and said lens, aperture and element positioning together enabling exposure of an area of said element of less than 9 $cm^2$ per scene photographed;
   a shutter mounted to said body and positioned between said lens and said element and enabling on opening, exposure of said element for a preset interval of between 1/60 to 1/500 second;
   a shutter release mounted to said body for opening said shutter;
   a power source mounted within said body;
   a sound module mounted into said body and powered by said power source, said sound module being capable of storing in non-volatile fashion a prearranged smile sound and, when activated, of emitting said smile sound on signal; said sound characterized in being audible at distance of about 5 meters; and
   a switch mounted to said body for activating said sound module; wherein
   said means to emit a smile sound is activated by the switch to activate said sound module; and
   said camera further comprises an arm common to both the switch and a shutter-release; wherein partial movement of the arm activates the switch and further movement of the arm activates the shutter-release.

2. The camera of claim 1 wherein said smile sound may be recorded on said sound module by the camera user.

3. The camera of claim 1 wherein said smile sound means is a chime sound.

4. The camera of claim 1 wherein said smile sound means is a song sound.

5. The camera of claim 1 wherein said smile sound means is a voice sound.

6. The camera of claim 1 wherein said camera further comprises a flash activated by said shutter.

7. The camera of claim 1 wherein said smile sound means emits a nursery rhyme sound.

8. The camera of claim 1 wherein said smile sound is activated by squeezing a part of a camera that comprises a switch.

9. A camera as in claim 1 wherein said sound module is pre-programmed with a smile sound message.

10. A camera as in claim 1 wherein said sound module is user programmable with a smile sound.

11. A camera as in claim 1 further comprising a flash unit activated by the shutter-release.

12. The camera of claim 1 wherein said camera has a viewfinder opening in the front face and an aperture separate from the lens for viewing a subject to be photographed.

13. The camera of claim 1 wherein the depth, height, and length define, at their respective confluence, corners and edges, the majority of said corners and edges finished with a radius of curvature of between 0.2 and 3 cc.

14. The camera of claim 1 wherein said total volume is less than 380 cc.

15. The camera of claim 13 wherein said total volume is less than 300 cc.

\* \* \* \* \*